May 25, 1954 — C. A. HERRICK — 2,679,105
RELOCATING INSTRUMENT FOR FISHERMEN
Filed Nov. 10, 1950
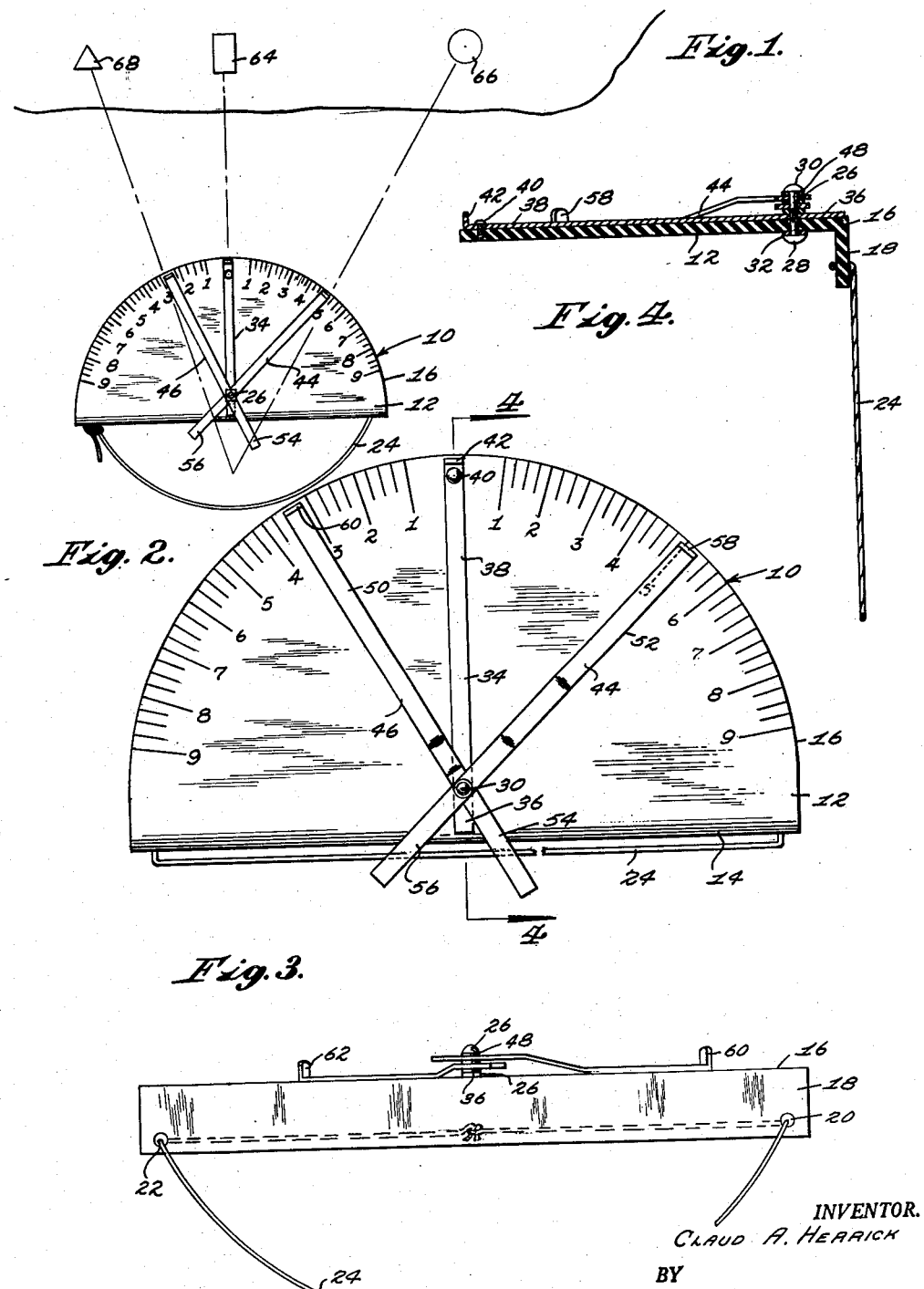
INVENTOR.
CLAUD A. HERRICK
BY
McMorrow, Berman & Davidson
ATTORNEYS Patented May 25, 1954

2,679,105

UNITED STATES PATENT OFFICE 2,679,105

RELOCATING INSTRUMENT FOR FISHERMEN

Claud A. Herrick, Rochester, N. Y.

Application November 10, 1950, Serial No. 195,049

1 Claim. (Cl. 33—64)

This invention relates to novel improvements in location finders and has for its primary object to provide an instrument of the protractor type, which is especially designed for use by a fisherman to permit accurate revisitation to previously found fishing spots.

Another object of this invention is to provide an extremely simple and compact location relocating instrument, which can be effectively employed by anyone, regardless of knowledge of navigation or mathematics, the instrument being extremely effective in relocating, within casting distance, a fishing spot, previously discovered.

These and ancillary objects and structural features of merit are attained by this invention, the preferred embodiment of which is set forth in the following description and illustrated in the accompanying drawing, wherein:

Figure 1 is a perspective environmental illustration of the relocation finder instrument;

Figure 2 is a top plan view of the instrument;

Figure 3 is a rear end elevational view thereof;

Figure 4 is a cross sectional view taken on line 4—4.

With reference to the accompanying drawing, the relocation finder instrument 10 includes a flat extremely light semi-circular plate 12, which is preferably formed from plastic material and has a straight rearward edge 14 and an arcuate or semi-circular forward edge 16. The upper surface of the forward edge 16 is suitably graduated in an extremely simple manner and the rear edge is formed with a depending flange 18. The flange 18 is provided, adjacent its opposing ends, with openings 20 and 22 for the reception of a body engaging cord 24. In use, the cord 24 is looped over the user's head to a position around his neck, and the plate 12 is then held by one or both hands at eye-level at whatever distance before the eyes is comfortable and at which the user may easily sight over the plate 12 and see the shoreline or other distant objects. While so hung around the neck, the cord 24 permits the plate 12 to lie flat on the chest and to be readily available to the user.

A pivot and fastening element 26, such as a rivet, is vertically inserted through the plate 12 at the center of the rear edge 14, the pivot having end heads 28 and 30, the head 28 on the underside of the plate being spaced by a washer 32 from contact with the plate.

Projecting forwardly from the pivot element 26 and disposed in a normal position to the rearward edge is a fixed pointer arm 34, the arm having its rear end 36 mounted on the pivot element.

The forward end 38 of the fixed central arm 34 is fixed by a rivet 40 to the upper surface of the plate, the forward end intersecting the center or zero point of the scale and having an upstanding sight terminal 42.

Pivotally mounted on the pivot element are movable sight arms 44 and 46, the journaled ends of the arms being spaced out of engagement by the spacers 48 and being offset from the outer ends thereof, which are superimposed on the upper surface of the plate and lie in a plane common to the plane of the fixed arm. The outer or forward ends 50 and 52 of the movable and adjustable sight arms slidably engage the upper surface of the plate and are operatively positioned on opposite sides of the fixed arm 34, the rearward ends 54 and 56 overlying in crossed and spaced fashion the rearward end 36 of the fixed center erm.

Sights 58 and 60 project upwardly from the terminals of the forward ends of the movable arms and are disposed at right angles to the body portion thereof, the sight terminals traveling in arcuate paths in opposite directions from the fixed arm within the confines of the arcuate edge and overlying the scale. The sights have straight outer vertical sighting edges 60 and 62, lying perpendicular to the plate 12.

In use, attention is directed to Figure 1, wherein the relocating instrument is depicted as operatively utilized for locating a previously discovered fishing spot or location. After locating a particularly excellent fishing location in a lake, for example, a fisherman is extremely desirous of noting the exact casting location thereof for future exploitation.

Thus, the instant instrument is attached by means of the cord 24, which is adjusted until the plate is disposed forwardly of the user at a convenient and effective position in relation to his ocular range and sighting capacity. The fixed arm is then aligned axially with a shore object, such as the house 64. The house 64 is sighted by the alignment therewith of the upper terminal of the pivot 26 and the upstanding sight terminal 42 of the fixed center arm. The movable arm 44 is then shifted, with the plate held in the position acquired by an alignment of the center arm with the house. Alignment of the sight terminal 58 with the eye of the user, and with the shore object on the right of the house, such as the tank 66 is effected by manual manipulation of the projecting end 56 of the arm. Similarly, the sight terminal 60 of the arm 46 is lined up with the shore tower 68 and the eye of the user.

The angular relationship between the fixed arm and movable arm is noted, such relationship being, as depicted in Figure 1, 2¾ left and 4¾ right, respecting the fixed zero or constant line, represented by the fixed arm. Of course, the cord, prior to sighting, has been adjusted to the proper length, so that the plate can be disposed forwardly of the eye level of a user according to his peculiar eyesight.

Thus, the central arm is focused on a center or fixed object and the sight terminals of the movable sight arms are aligned with shore objects to the left and right of the center object, the latter being effective in locating the distance from the shore line.

Upon revisiting the chartered locality, the center arm is aligned with the center shore object, the house 64, and the boat is moved outwardly in a straight line travel therefrom, until the movable arms can be positioned in their previously noted positions in relation to the scale. At that point, the spot has been located.

Of course, for additional security, wind or current direction may be noted in cumulation with the sighting data obtained by the foregoing instrument and the distance from the shore line to the boat may be noted and utilized as an adjunct to the data obtainable by the utilization of the instant instrument.

Having thus described this invention, what is claimed is:

A relocation instrument comprising a flat, semi-circular body having an arcuate forward edge extending through 180°, said forward edge being provided with a zero graduation marking midway between its ends and with a series of digital graduations at each side of the zero marking arranged in ascending order from said marking toward the respective ends of the forward edge, the body having a straight rear edge and a depending longitudinal flange on said rear edge formed with openings at opposite ends thereof; a combined fastening and pivot element upstanding from the body midway between the opposite ends of and adjacent the straight edge thereof; a fixed pointer arm disposed flat against said body normally to the straight edge, said arm having one end connected to the body by the pivot element and its other end secured to the body at the zero marking; an upstanding sight terminal on said other end of the fixed arm aligned longitudinally of the fixed arm with the pivot element; a first movable sight arm having one upwardly offset end overlying said one end of the fixed arm and pivotally joined to the body by the pivot element, the other end of the first movable arm traversing one of said series of graduations and being formed with an upstanding sight terminal; a second movable arm having one end offset upwardly to a greater height than and overlying the first-named end of the first movable arm, said end of the second movable arm being pivotally joined to the body by said element, the other end of the second movable arm traversing the other series of graduations and being formed with an upstanding sight terminal to be used in conjunction with the first and second-named terminals, in fixing a point at which an instrument reading is to be taken; and an endless flexible element extending through said openings of the flange and adjustable as to length, said element having a slack portion adapted to be tensioned into engagement with a selected part of a user's body, for positioning of said semi-circular body at an adjusted location disposed forwardly of the user's eye and selected according to the user's ocular range and sighting capacity.

References Cited in the file of this patent

UNITED STATES PATENTS

| Number | Name | Date |
|---|---|---|
| 462,234 | Brotherhood | Nov. 3, 1891 |
| 576,900 | Scott | Feb. 9, 1897 |
| 807,153 | Clark | Dec. 12, 1905 |
| 895,330 | Baur | Aug. 4, 1908 |
| 2,164,463 | Mather | July 4, 1939 |

FOREIGN PATENTS

| Number | Country | Date |
|---|---|---|
| 109,981 | Great Britain | Sept. 24, 1917 |
| 166,672 | Austria | Sept. 11, 1950 |